(12) United States Patent
Schaffer

(10) Patent No.: US 6,892,191 B1
(45) Date of Patent: May 10, 2005

(54) MULTI-FEATURE COMBINATION GENERATION AND CLASSIFICATION EFFECTIVENESS EVALUATION USING GENETIC ALGORITHMS

(75) Inventor: J. David Schaffer, Wappingers Falls, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/498,882

(22) Filed: Feb. 7, 2000

(51) Int. Cl.$^7$ ............................................. G06F 17/30
(52) U.S. Cl. ............................. 706/14; 706/13; 706/15
(58) Field of Search ...................... 706/13–15

(56) References Cited

U.S. PATENT DOCUMENTS

| | | | | |
|---|---|---|---|---|
| 4,821,333 A | * | 4/1989 | Gillies | 382/308 |
| 5,048,095 A | * | 9/1991 | Bhanu et al. | 382/173 |
| 5,146,406 A | * | 9/1992 | Jensen | 704/9 |
| 5,343,251 A | | 8/1994 | Nafeh | 348/571 |
| 5,410,344 A | | 4/1995 | Graves et al. | 725/46 |
| 5,479,523 A | * | 12/1995 | Gaborski et al. | 382/159 |
| 5,682,206 A | | 10/1997 | Wehmeyer et al. | 725/58 |
| 5,754,939 A | | 5/1998 | Herz et al. | 455/3.04 |
| 5,798,785 A | | 8/1998 | Hendricks et al. | 725/46 |
| 5,897,629 A | | 4/1999 | Shinagawa et al. | 706/13 |

OTHER PUBLICATIONS

Genetic Algorithm Selection of Features for handwritten Character Identifrication, Roger S. Gaborski, Peter G. Anderson, David G. Tilley, Christopher T. Asbury, (1993) IEEE, pp. 1–8.*

* cited by examiner

*Primary Examiner*—Anthony Knight
*Assistant Examiner*—Michael B. Holmes
(74) *Attorney, Agent, or Firm*—Edward W. Goodman

(57) ABSTRACT

The features that are presented to an evolutionary algorithm are preprocessed to generate combination features that may be more efficient in distinguishing among classifications than the individual features that comprise the combination feature. An initial set of features is defined that includes a large number of potential features, including the generated features that are combinations of other features. These features include, for example, all of the words used in a collection of content material that has been previously classified, as well as combination features based on these features, such as all the noun and verb phrases used. This pool of original features and combination features are provided to an evolutionary algorithm for a subsequent evaluation, generation, and determination of the best subset of features to use for classification. In this evaluation and generation process, each combination feature is processed as an independent feature, independent of the features that were used, or not used, to form the combination feature. In this manner, for example, a particular phrase that is generated as a combination of original feature words may be determined to be a better distinguishing feature than any of the original feature words and a more efficient distinguishing feature than an unrelated selection of the individual feature words, as might be provided by a conventional evolutionary algorithm. The resultant best performing subset is subsequently used to characterize new content material for automated classification. If the automated classification includes a learning system, the evolutionary algorithm and the generated combination features are also used to train the learning system.

12 Claims, 2 Drawing Sheets

MULTI-FEATURE COMBINATION GENERATION AND CLASSIFICATION EFFECTIVENESS EVALUATION USING GENETIC ALGORITHMS

BACKGROUND OF THE INVENTION

1. Field of the Invention

This invention relates to the field of classification systems, and in particular to the selection of the features and combinations of features that are used to determine a given sample's classification.

2. Description of Related Art

Consumers are being provided an ever-increasing supply of information and entertainment options. Hundreds of television channels are available to consumers, via broadcast, cable, and satellite communications systems, and the Internet provides a virtually unlimited supply of material spanning most fields of potential interest. Because of the increasing supply of information, entertainment, and other material, it is becoming increasingly difficult for a consumer to locate material of specific interest. A number of techniques have been proposed for easing the selection task, most of which are based on a classification of the available material's content, and a corresponding classification of a user's interest.

A number of methods are available for characterizing the content of a particular piece of material. In the entertainment field, television guides containing a synopsis of each program are available, and automated systems have been proposed for categorizing programs, and segments of programs, based on an analysis of the images contained in each image frame. In the information field, web crawlers are used to extract key words and phrases from each web page to facilitate the search for material based on such key words or phrases, or synopses of select web pages are manually created to form an index to facilitate these searches. In like manner, speech recognition techniques may be employed to create an index of key words used in a television or radio program, or in the lyrics of a song, and so on. Other characterization methods are also employed based on other factors as well. For example, the time of day, day of the week, and season of the year may be included in the characterization of broadcast entertainment material, distinguishing, for example, between "prime time" programs and "before dawn" programs, as a potential indicator of program quality or popularity. The producer, director, actors, broadcast network, type of provider, and so on, may also be used to characterize a program. In the information field, similar parameters may also be used, such as the number of "hits" a particular web page experiences per day, the number of other web pages that reference this web page, the author of the web page, and so on.

For ease of reference, the term "content material" is used hereinafter to refer to material that is related to the contents of information items, entertainment items, and other items that are potentially available for classification or characterization. The content material may include the contents of the information or entertainment item itself, an abstract or synopsis of the item, information related to the creation or presentation of the item, and so on. The term "feature" is used hereinafter to refer to a characteristic that is potentially available to facilitate the classification or characterization. For example, each word in a synopsis of a television program is a feature that can be used to facilitate the characterization of the content material of that television program; the director's name is also a feature, as is the time of day that the program is broadcast. In like manner, each key word of a web page is a feature, as is the provider of the web page, the family of pages to which this page belongs, and so on.

The effectiveness and efficiency of a classification system is highly dependent upon the choice of features used to classify the content material. This effectiveness and efficiency is particularly dependent upon the choice of features that comprise a combination of features. The choice of features that comprise a combination of features is often a subjective choice, and is often a manually intensive process. For example, it is straightforward to use the words of a synopsis as the set of features that will be used to classify a television program. Each synopsis is processed to identify each word and to remove noise words. The resultant list of words used in the synopsis, potentially ordered by their frequency of occurrence, are stored in a database for subsequent processing to determine the subject matter classification for that content material, or to determine whether these words are correlated with words that are related to a user's preference, and so on. Not every word, however, is equally effective in distinguishing among programs of different classifications. Some words, for example, may have a high frequency of occurrence in programs, regardless of the program's classification. Other words may have a low frequency of occurrence, but when they appear, are highly effective for distinguishing between program classifications. Evolutionary algorithms, discussed below, have been demonstrated to be particularly effective for determining the combination of features that provide a high degree of distinction among programs of differing classifications. In a traditional evolutionary algorithm, a chromosome is formed that contains combinations of features, in the above example, the chromosome would contain a subset of all the words used in the synopses of many programs. Different chromosomes would contain different subsets. If a particular set of words is effective in distinguishing programs, each chromosome that contains these words in its subset of words will generally exhibit a better classification performance than a similar chromosome with fewer of these particular words, whereas the presence or absence of words that are common to a variety of classifications will not significantly affect their chromosomes' classification performance. By continually evolving alternative chromosomes based on the performance of prior chromosomes, with a preference for the evolution of chromosomes having traits (subsets of words) similar to those of the better performing prior chromosomes, the performance of the evolved chromosomes can be expected to increase. At the end of the evolutionary process, a single chromosome, or subset of words, is selected as the best performing set of words for distinguishing among program classifications.

The need for a selection of a set of features that provides an effective and efficient means of characterizing or classifying content material is particularly important as the resources available for such characterizing or classifying become limited. For example, as technologies become available, viewers will expect their newly acquired home entertainment systems to provide program selection assistance, based on a "preferences" profile. These systems, however, will typically contain limited processing and storage capabilities, and may not, for example, be able to store every word and phrase of every synopsis available for such selection assistance. The inclusion of a non-discriminating word in the limited storage will be wasteful, and, more significantly, may also decrease the classification accuracy by introducing false distinctions. Thus, a classification system must be effective in the dual task of selecting effective discriminating features and excluding counter-productive non-discriminating features, and, in general, the effects of including or excluding a feature are non-additive.

BRIEF SUMMARY OF THE INVENTION

Evolutionary algorithms hold the promise of providing an identification of the most effective words, or features, to include in a classification system having limited processing and storage capabilities, and this invention addresses a method and apparatus that further enhance the use of evolutionary algorithms for identifying effective feature subsets.

It is an object of this invention to facilitate the identification and choice of features that are used: to characterize content material using an evolutionary algorithm. It is a further object of this invention to facilitate the formation of combination features that are used to characterize content material using an evolutionary algorithm.

These objects and others are achieved by preprocessing the features that are presented to an evolutionary algorithm to generate combination features that may be more efficient in distinguishing among classifications than the individual features that comprise the combination feature. An initial set of features is defined that includes a large number of potential features, including the generated features that are combinations of other features. These features include, for example, all of the words used in a collection of content material that has been previously classified, as well as combination features based on these features, such as all the noun and verb phrases used. This pool of original features and combination features is provided to an evolutionary algorithm for a subsequent evaluation, generation, and determination of the best subset of features to use for classification. In this evaluation and generation process, each combination feature is processed as an independent feature, independent of the features that were used, or not used, to form the combination feature. In this manner, for example, a particular phrase that is generated as a combination of original feature words may be determined to be a better distinguishing feature than any of the original feature words and a more efficient distinguishing feature than an unrelated selection of the individual feature words, as might be provided by a conventional evolutionary algorithm. The resultant best performing subset is subsequently used to characterize new content material for automated classification. If the automated classification includes a learning system, the evolutionary algorithm and the generated combination features are also used to train the learning system.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
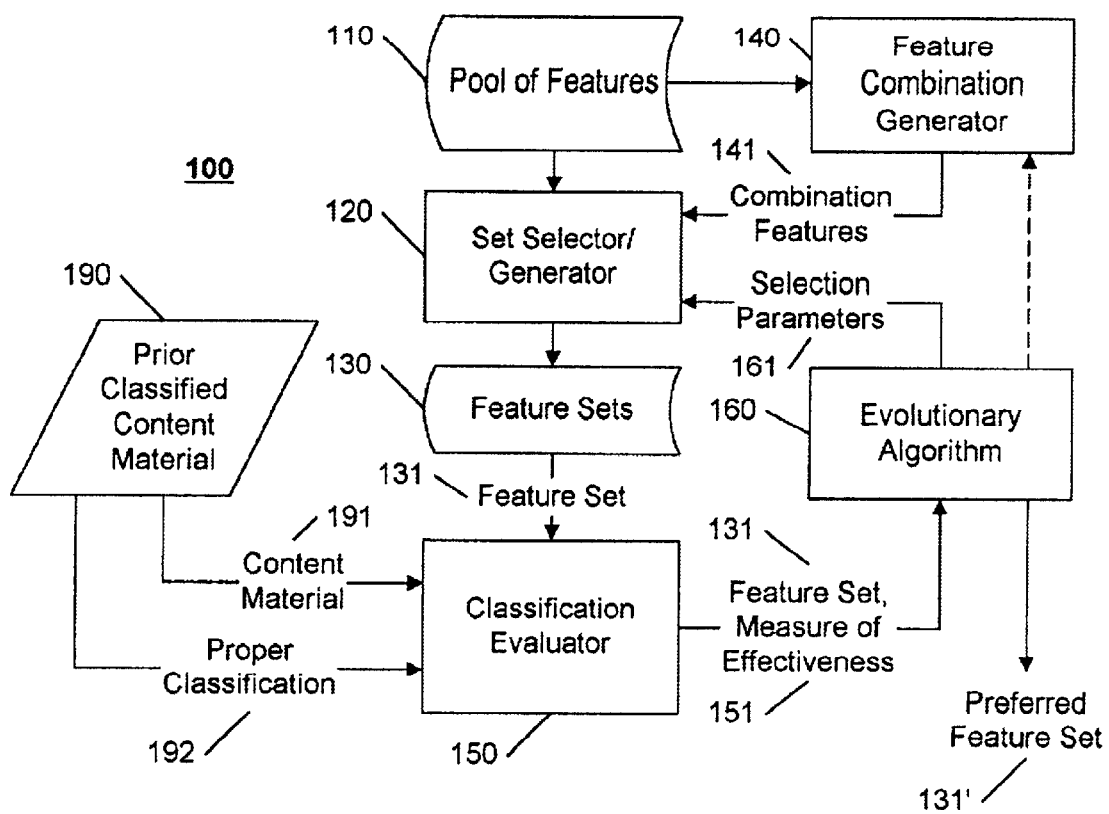
FIG. 1 illustrates an example block diagram of a feature set selection system with a feature combination generator in accordance with this invention.

This invention is based on the observation that certain combinations of features, such as words, contain significantly more classification-sensitive information than the individual words that form the combination. Also, in many cases, the individual features may have a detrimental effect on the overall ability to distinguish among classifications. Consider, for example, highly descriptive phrases, such as "red cross", "flying saucer", "green beret", and so on. It would be rare that a program containing one of these phrases in its synopsis would be categorized in the same category as another program whose synopsis contains one of the other phrases. That is, each of these phrases is well suited to distinguish among program categories. The individual words, "red", "green", "cross", "saucer", "beret", and "flying", taken out of context from their distinguishing phrases, are likely not to be as effective for distinguishing classifications. Some of these words, such as "red" and "green" may be more suggestive of another classification, such as "art", and thereby serve to decrease the classification effectiveness of a system that uses these words out of context. A conventional feature selection system based on individual features, such as a conventional evolutionary algorithm that uses the words contained in a program synopsis, may include both the features of "red" and "cross", but because they are virtually independent features, the distinguishing capabilities of these features is likely to be poorer than a single feature "red cross"; and, because the feature "red" may be strongly correlated to another classification, the resultant classification using the independent feature "red" may be in error. In like manner, the occurrence of "the red cross" would likely be more indicative of a classification than an occurrence of "a red cross", whereas a conventional classification process would not use the word "the" as a distinguishing feature.

In accordance with one aspect of this invention, combination features are generated from the individual features that are conventionally used to classify content material. In accordance with another aspect of this invention, these generated combination features are treated as being substantially independent of the features that form the combination. For example, if "red" is strongly correlated with an "art" classification, and "red cross" is strongly correlated to a "humanitarian" classification, both features, the original "red" feature and the generated "red cross" feature, may be included in the feature set that is used to classify content material.

In addition to the generation of word phrases that may have effective distinguishing capabilities, other feature combinations may be formed. For example, particular director-producer, director-actor, actor-actress combinations may provide for a better characterization of content material than the individual director, actor, actress, and producer features. Similarly, the combination of the provider of a web site and particular key words or phrases may facilitate a more effective characterization of a web page. For example, the combination of "Philips" as the provider of information on a web page and "entertainment systems" as a key phrase may characterize a page differently than the presence of "Philips" and "entertainment systems" on a web page that is provided by a different provider.

Because the number of potential basic features and combination features is virtually limitless, requiring therefore the use of a subset of features for content material classification, an evolutionary algorithm is used in a preferred embodiment for selecting which of the features to use.

FIG. 1 illustrates an example block diagram of a feature set selection system 100 in accordance with this invention. The example selection system 100 includes an evolutionary algorithm 160 that is used to generate sets of features that are evaluated with regard to their effectiveness in classifying content material. The evolutionary algorithm 160 uses a pool of features 110 as candidate features for inclusion in the selected set of features that are used in the classification process. In accordance with one aspect of this invention, a feature combination generator 140 is used to generate combination features 141 that include combinations of individual features. Techniques are conventionally available for identifying noun-phrases and verb-phrases, by identifying, for example, adjectives followed by nouns, adverbs followed by verbs, adverb-adjective-noun combinations, and so on. A simpler technique, such as the selection of every sequential pair of words and every sequential triplet of words, or every pairing of non-word features, such as actor-director, producer-director, actor-producer, and so on, may also be used in the feature combination generator 140.

As discussed above, the number of different features, including both the basic features and the combination features, that can be used to facilitate the classification of content material is very large, particularly when features can be formed as combinations of other features. The number of possible subsets that may be drawn from a very large pool of features can be astronomically large. In accordance with this invention, the evolutionary algorithm 160 is used to determine a set of features that is likely to be more effective than other sets of features for a given classification task.

Evolutionary algorithms operate via an iterative offspring production process, and include genetic algorithms, mutation algorithms, and the like. In a typical evolutionary algorithm, certain attributes, or genes, are assumed to be related to an ability to perform a given task, different sets of genes resulting in different levels of effectiveness for performing that task. The evolutionary algorithm is particularly effective for problems wherein the relation between the set of attributes and the effectiveness for performing the task does not have a closed form solution. Copending U.S. patent application "Code Compaction By Evolutionary Algorithm", U.S. Ser. No. 09/217,408, filed 21 Dec. 1998, incorporated by reference herein, discloses the use of evolutionary algorithms for compacting software code, data files, and the like. Copending U.S. patent application "Method For Improving Neural Network Architectures Using Evolutionary Algorithms", U.S. Ser. No. 09/387,488 filed 1 Sep. 1999, incorporated by reference herein, discloses the use of evolutionary algorithms for determining a preferred architecture for use in a neural network for solving a given task.

The offspring production process of an evolutionary algorithm is used to determine which particular sets of genes are most effective for performing a given task, using a directed trial and error search. A set of genes, or attributes, is termed a chromosome. In the genetic algorithm class of evolutionary algorithms, a reproduction-recombination cycle is used to propagate generations of offspring. In the reproduction phase of the reproduction-recombination cycle, members of a population having different chromosomes mate and generate offspring. These offspring have attributes passed down from the parent members, typically as some random combination of genes from each parent. In a classic genetic algorithm, the individuals that are more effective than others in performing the given task are provided a higher opportunity to mate and generate offspring. That is, the individuals having preferred chromosomes are given a higher opportunity to generate offspring, in the hope that the offspring will inherit whichever genes allowed the parents to perform the given task effectively. The recombination phase of the reproduction-recombination cycle effects the formation of the next generation of parents based on a preference for those exhibiting effectiveness for performing the given task. In this manner, the number of offspring having attributes that are effective for performing the given task will tend to increase with each generation. Paradigms of other methods of generating offspring, such as asexual reproduction, mutation, and the like, are also used to produce generations of offspring having an increasing likelihood of improved abilities to perform the given task.

In the context of this disclosure, the population consists of members having features that may be effective in classifying content material. In accordance with this invention, some features represent combinations of other features, independent of the individual features. That is, for example, the phrase "flying saucer" may be a feature, whose effectiveness in characterizing and classifying content material is processed substantially independent of the "flying" feature and the "saucer" feature. That is, the feature "flying saucer" will be passed on to future generations, or not passed on to future generations, without regard to whether the features "flying" or "saucer" are passed on. Generally, for example, noun phrases and verb phrases are treated as features that are independent of the word features that form such phrase features; director-actor features are independent of the particular director or actor feature, and so on. It has been found that this independent consideration of combination features is particularly well suited for the selection of classification features for use in a limited-resource embodiment, such as the aforementioned embodiment for a home entertainment system. That is, if the number of features that can be utilized for a particular embodiment is limited, the independent consideration of combination features will often lead to an elimination of redundant feature items. Assume, for example, that that aforementioned "flying saucer" feature is one that is highly effective in determining whether a given program is classified as "science fiction". Once the "flying saucer" feature becomes a dominant gene in each generation of offspring, the "flying" and "saucer" feature genes are likely to die out, because the marginal effectiveness gained or lost by including or not including the "flying" or the "saucer" feature gene is likely to be minimal in chromosomes that contain the "flying saucer" gene. As the "flying" and "saucer" feature genes die out in a limited-feature embodiment, they are replaced by other features, such as a "murder" feature gene that is effective in determining whether a given program is classified as "mystery".

In summary, features are defined that may potentially facilitate the classification of content material, and, in a preferred embodiment, these features include combinations of other features. Candidate sets of select features are encoded as chromosomes that reflect different sets of abilities for distinguishing the content material to facilitate classification of the content material. Some sets of features are more effective for classifying the content material than other sets. By generating offspring from the members having chromosomes that are more effective for classification than others, the effectiveness of the offspring for properly classifying content material is likely to increase.

As illustrated in FIG. 1, a pool of features 110 is provided that includes those features that may potentially facilitate a classification of content material. As discussed above, these features may include the words used in content material, the words used in the synopses of content material, the creator of the content material, the performers in the content material, and so on. The feature combination generator 140 augments this pool of features 110 with combination features 141, as discussed above. In a preferred embodiment, multiple techniques are employed in the combination generator 140 to generate combination features: a phrase identifier creates a feature for each phrase, and a combinatorial generator generates a variety of combinations of the features that are not word based. The combination generator 140 also allows for the predefinition of likely combinations, such as director-actor, as well as the generation of substantially random combinations. These and other methods of generating combination features will be evident to one of ordinary skill in the art in view of this invention.

A set selector 120 creates a set of features from this pool of features 110. The set selector 120 provides an initial population of feature sets 130 to a classification evaluator 150 to evaluate the effectiveness of each set of features 131 for classifying a collection 190 of preclassified content material. The collection 190 contains content material items 191 and the proper classification 192 of each of the content material items 191. That is, for example, the collection 190 may be a collection of information regarding television programs, and the proper classification 192 is the category within which an existing program guide placed each television program 191, such as comedy, drama, sci-fi, mystery, news, and so on. Alternatively, the proper classification 192 may be provided by a potential viewer who classifies each program 191 as "strongly likes", "likes", "no opinion", "dislikes", and "strongly dislikes". In a simpler embodiment, the collection 190 may contain the information regarding all television programs provided during the past month, and the proper classification 192 is whether a particular viewer "watched" or "didn't watch" each program 191. Using an on-line monitor of the programs selected for viewing, this simpler embodiment allows for a classification of each television program 191 into the two classes of watched and not-watched without requiring a direct user input. In like manner, the collection of content material 190 may be a collection of electronic documents, a collection of abstracts, a collection of web pages, and so-on, and the proper classification 192 may be "fiction", "history", "gossip", and so on. Or, in the classification 192 may merely be "viewed" and "not-viewed".

Using techniques described hereinafter, the classification evaluator 150 determines the effectiveness 151 of each candidate set of features 131 for providing a classification that corresponds to the proper classification 192 of each content material item 191. The evolutionary algorithm 160 thereafter provides parameters to the selector 120 for creating the next generation of feature sets 130, based on the effectiveness 151 of the prior generation of feature sets 130. As is common in the art of evolutionary algorithms, discussed above, the evolutionary algorithm 160 provides parameters 161 that favor the generation of sets having features common with the more effective sets of the prior generation. The evolutionary algorithm 160 continues to produce, via the set selector 120, generation after generation of candidate sets of features until a preferred set 131' is identified, typically the best performing set of features 131 found during this offspring generation process. A; number of techniques are available for terminating the search for the preferred set 131'. A fixed time limit may be placed on the offspring generation process, the number of generations may be limited, convergence characteristics may be mused to terminate the process when the incremental gain of each generation is below a cutoff limit, and so on.

Figure 2:
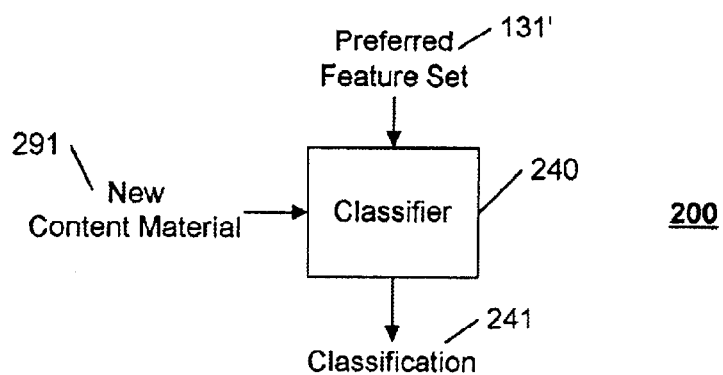
FIG. 2 illustrates an example block diagram of a classification system for classifying content material based on a preferred feature set as determined by the feature set selection system in accordance with this invention.

As illustrated in FIG. 2, when a feature set 131' is found that has been shown to be effective in classifying the collection of prior classified material 190, it is used by a classifier 240 to classify new content material 291. The classifier 240 uses the same-classification process that is used in the classification evaluator 150. If, for example, the preferred feature set 131' was effective for classifying programs 191 as comedy, mystery, drama, etc., and the same classification process is used in the classifier 240, it is reasonable to assume that this same set 131' will be effective for classifying unknown programs 291 into comedy, mystery, drama, etc. In like manner, if the preferred feature set 131' was effective for classifying programs 191 as "watched" and "not-watched" by a particular viewer or a group of viewers, it is reasonable to assume that this same set 131' will be effective for classifying unknown programs 291 as programs that the viewer or group of views will be likely to watch or not watch. Or, in another application, the classifier 240 could use the set 131' for classifying synopses of upcoming programs, and present the results of the classification process as a list of "suggested programs to view", based on the viewer's prior classifications of programs 190.

A number of techniques can be applied to evaluate a set's effectiveness in classifying a collection 190 of content material. In a preferred embodiment of the invention, because the features of each evaluation set 131 may be different, a learning system is used to learn how to best apply each set of features 131 to the given classification task.

Figure 3:
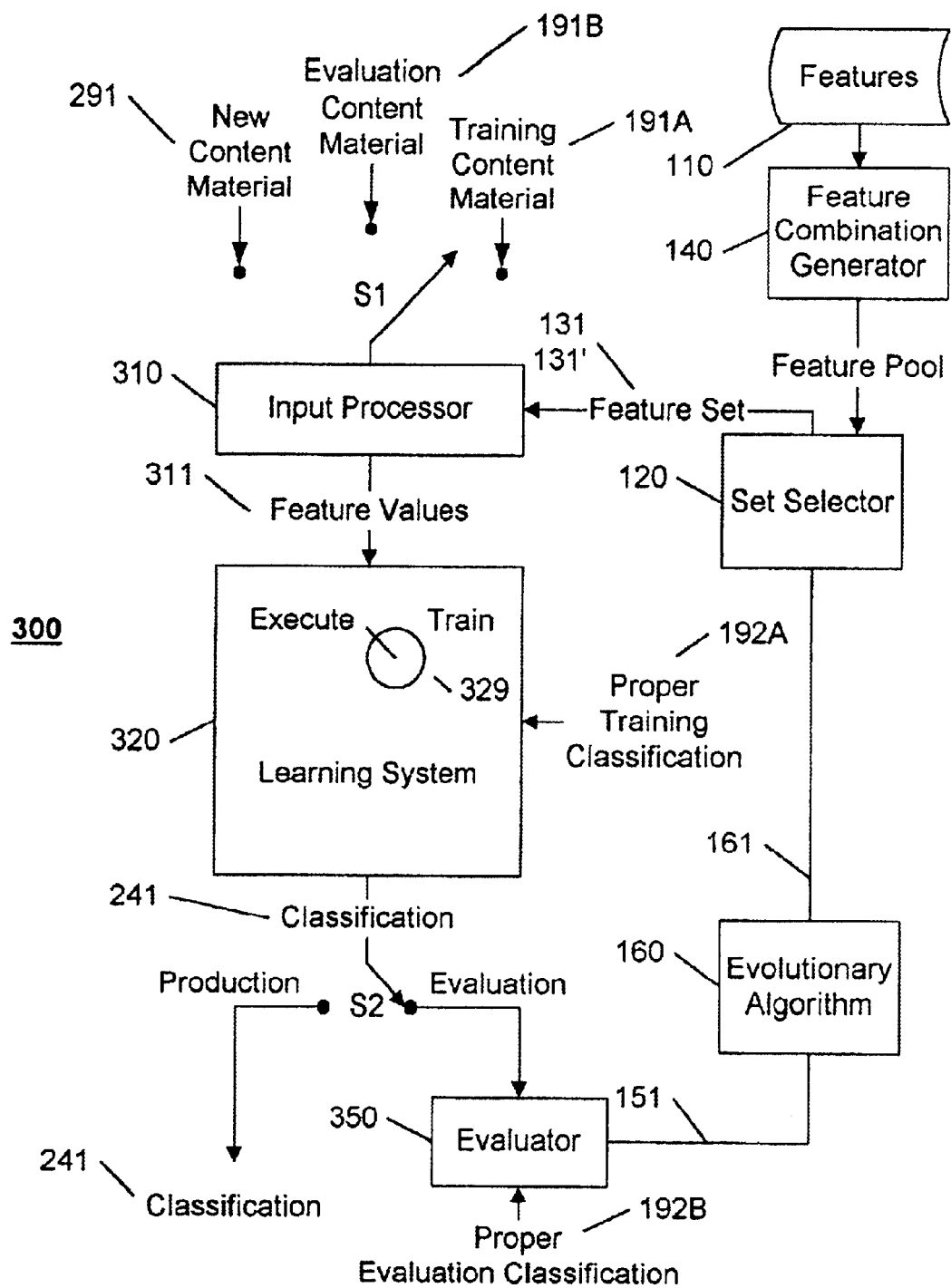
FIG. 3 illustrates an example block diagram of a classification system for classifying content material via a learning system in accordance with this invention.

FIG. 3 illustrates an example block diagram of a classification system 300 for classifying content material 291 via a learning system 320 in accordance with this invention. As will be evident from the following description, the classification system 300 provides the functions illustrated as the classification evaluator 150 of FIG. 1 and the classifier 240 of FIG. 2.

To train the learning system 320, a portion of the collection of prior classified content material (item 190 in FIG. 1) is used to provide training content material 191A, the remainder providing evaluation content material 191B. For each feature set 131 provided by the set selector 130, the training content material 191A is provided, via switch S1, to an input processor 310. The input processor processes the content material 191A to provide feature values 311 corresponding to the set of features 131 being used to train the learning system 320. For example, if the set of features includes word or phrase features, the input processor determines whether or not the content material 191A contains each of the word or phrase features, and, depending upon the learning system 320, perhaps the number of occurrences of each word or phrase feature. While the training content material 191A is being provided to the learning system 320, the learning system 320 is placed in a training mode, illustrated by the switch 329. Using techniques common in the art, such as the adjustment of weights of nodes in neural network, or the adjustment of correlation factors in a Bayesian classifier, the learning system 320 is trained to increase the likelihood that the given feature set 131 will provide a classification corresponding to the proper classification 192A corresponding to the training content material 191A. Subsequent training content material items 191A are similarly applied to the learning system 320 to increase the overall likelihood that the feature set 131 would-properly classify the training content material 191A.

After the learning system 320 is trained to optimize the performance of the feature set 131 relative to the training content material 191A, the previously classified evaluation content material 191B is provided to the input processor 310, via switch S1, and the corresponding feature values 311 are applied to learning system 320. The learning system 320 is operated in an execute mode, illustrated by switch 329, when the evaluation content material 191B is applied, so that the learning system 320 provides a classification 241 of the evaluation content material 191B based on the feature set 131 that was used to train the learning system 320. The determined classification 241 is provided to an evaluator 350, via the switch S2. The evaluator 350 compares the determined classification 241 with the proper classification 192B corresponding to the content material 191B. After processing each of the evaluation content material items 191B using the given feature set 131, the evaluator 350 provides a measure of effectiveness 151 to the evaluation algorithm 160, corresponding to the classification effectiveness of the given feature set 131. As discussed above, the evolutionary algorithm 160 provides selection parameters 161 to the set selector 130, based on the effectiveness of previously evaluated feature sets 131.

After a sufficient number of feature sets 131 are processed and evaluated against the evaluation content material 191B, the evolutionary algorithm 160 and set selector 130 provides the preferred feature set 131' as a final input to the input processor 310. Depending upon whether the parameters corresponding to the training of the learning system are saved for each evaluated feature set 131, the learning system 320 is either reloaded with these parameters, or retrained using these parameters. In this final step, because the preferred feature set 131' has been selected, and need not be reevaluated, the entire collection 190 of previously classified content material 191 may be applied as the training content material 191A, to potentially improve the likelihood of the preferred set 131' being able to classify new content material 291, by exposing the preferred set 131' to a larger variety of content material 191.

After training the learning system 320 to optimize the classification effectiveness of the preferred feature set 131', the switch S1 is switched to receive the new content material 291, the switch 329 is switched to place the learning system 320 into the execute mode, and the switch S2 is switched to the production mode. Thereafter, when each new content material item 291 is applied to the system 300, the system 300 provides a determined classification 241 of that new content material 291, based on the preferred feature set 131'.

Note that after the preferred feature set 131' is selected and the learning system 320 is trained, the evolutionary algorithm 350 and its related parts and other feature sets are no longer required to effect the classification of new content material 291. Thus, the components of the system 300 required to classify new content material 291 can be minimized to those illustrated in FIG. 2. In this manner, the classification system 300 can be embodied on a relatively large computing system to effect the training and evaluation required to determine the preferred set of features for a given classification task, and then the results of this determination, including the parameters that optimize the performance of a classifier 240 for the determined set of features, can be downloaded to a limited-capacity classifier 240. In one preferred embodiment, for example, a set-top box is used to interface with a classification system 300 that is located at a site on the Internet, and the results of the determination of the preferred feature set and related parameters are subsequently downloaded to the set-top box.

The foregoing merely illustrates the principles of the invention. It will thus be appreciated that those skilled in the art will be-able to devise various arrangements which, although not explicitly described or shown herein, embody the principles of the invention and are thus within its spirit and scope. For example, the combination features 141 are presented above as inclusive combinations, for ease of understanding. That is, for example, the feature "red cross" includes both the "red" and "cross" feature occurring sequentially. Alternatively, a combination feature may be defined as the occurrence of one feature in the absence of another feature, such as "red" without "cross" immediately following, or "cross" without "red" immediately preceding. Such variations, and others, will be evident to one of ordinary skill in the art, and included within the spirit and scope of the following claims.

I claim:

1. A method for determining a preferred set of features for classifying content material, comprising:

augmenting a pool of features with combination features that are based on two or more features in the pool of features, selecting a first plurality of feature sets from the pool of features, evaluating each feature set of the first plurality of feature sets to provide a measure of effectiveness of each feature set relative to each evaluated feature set's ability to properly classify previously classified content material, and, selecting at least one subsequent plurality of feature sets from the pool of features based on the measure of effectiveness of each evaluated feature set, and evaluating each feature set of the at least one subsequent plurality of feature sets to provide the measure of effectiveness of each evaluated feature set relative to each feature set's ability to properly classify previously classified content material, and, selecting the preferred set of features based on the measure of effectiveness of each evaluated feature set.

2. The method of claim 1, wherein selecting the at least one subsequent plurality of feature sets includes an evolutionary generation of the plurality of feature sets based on the measure of effectiveness of each evaluated feature set.

3. The method of claim 1, wherein evaluating each feature set includes:

classifying the previously classified content material via a classifier to provide an evaluation classification, and comparing the evaluation classification to a proper classification.

4. The method of claim 3, further including training the classifier using each feature set of the first and at least one subsequent plurality of feature sets.

5. The method of claim 1, wherein the content material includes at least one of: a video program, an audio program, an electronic document, and a web page.

6. The method of claim 1, wherein the combination features include at least one of: a noun phrase and a verb phrase.

7. A feature set selector that selects a preferred set of features that facilitates a classification of content material, comprising:

a feature combination generator that is configured to augment a pool of features by forming combination features that are based on two or more features of the pool of features, a subset selector that is configured to select a plurality of subsets of features from the pool of features, a classifier that is configured to classify prior classified content material using each subset of features of the plurality of subsets of features to provide an evaluation classification associated with each subset of features, an evaluator that is configured to evaluate each subset of features to provide a measure of effectiveness associated with each subset of features by comparing the evaluation classification associated with each subset of features and a proper classification associated with the prior classified content material, and an evolutionary algorithm that is configured to provide selection parameters based on the measure of effectiveness associated with each subset of features, and wherein the subset selector is configured to select subsequent pluralities of subsets of features based on the selection parameters, and the evolutionary algorithm provides the preferred set of features that facilitates the classification of content material in dependence upon the measure of effectiveness of each subset of features.

8. The feature set selector of claim 7, wherein the classifier is configured as a learning system, and the evolutionary algorithm and subset selector are further configured to provide the plurality of subsets of features to the classifier to facilitate a training of the learning system.

9. The feature set selector of claim 7, wherein the combination features include at least one of: a noun phrase and a verb phrase.

10. A classification system comprising:

a feature combination generator that augments a pool of features with combination features that are a combination of other features in the pool of features, an evolutionary algorithm that is configured to generate sets of features based on measures of effectiveness associated with other sets of features, and to determine thereby a preferred set of features, and a classifier that is configured to classify content material based on the preferred set of features.

11. The classification system of claim 10, wherein the classifier includes a learning system that is trained via the sets of features generated by the evolutionary algorithm.

12. The classification system of claim 10, wherein the combination features include at least one of: a noun phrase and a verb phrase.

* * * * *